US010909040B2

(12) United States Patent
Natarajan et al.

(10) Patent No.: US 10,909,040 B2
(45) Date of Patent: Feb. 2, 2021

(54) ADAPTIVE CALIBRATION OF NONVOLATILE MEMORY CHANNEL BASED ON PLATFORM POWER MANAGEMENT STATE

(71) Applicant: Intel Corporation, Santa Clara, CA (US)

(72) Inventors: Shankar Natarajan, Folsom, CA (US); Romesh Trivedi, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 209 days.

(21) Appl. No.: 15/957,650

(22) Filed: Apr. 19, 2018

(65) Prior Publication Data

US 2019/0042444 A1  Feb. 7, 2019

(51) Int. Cl.
*G06F 12/08* (2016.01)
*G06F 12/0871* (2016.01)
*G06F 12/02* (2006.01)
*G06F 12/0891* (2016.01)

(52) U.S. Cl.
CPC ...... *G06F 12/0871* (2013.01); *G06F 12/0246* (2013.01); *G06F 12/0891* (2013.01); *G06F 2212/222* (2013.01)

(58) Field of Classification Search
CPC ............. G06F 12/0871; G06F 12/0246; G06F 12/0891; G06F 2212/222–2228; G06F 2212/225; G06F 3/0679; G06F 3/068; G06F 3/0685
See application file for complete search history.

(56) References Cited

U.S. PATENT DOCUMENTS

| | | | |
|---|---|---|---|
| 8,667,215 B2 | 3/2014 | Marotta et al. | |
| 8,832,507 B2 | 9/2014 | Post et al. | |
| 9,811,269 B1 | 11/2017 | Ramalingam et al. | |
| 9,864,697 B2 | 1/2018 | Hale et al. | |
| 2004/0117441 A1* | 6/2004 | Liu ..................... | G06F 12/0888 709/203 |
| 2008/0215800 A1 | 9/2008 | Lee et al. | |
| 2010/0228922 A1* | 9/2010 | Limaye ............... | G06F 12/0897 711/135 |
| 2012/0173827 A1 | 7/2012 | Wood et al. | |
| 2012/0311293 A1 | 12/2012 | Nemazie et al. | |
| 2013/0046920 A1* | 2/2013 | Ryu .................... | G06F 12/0246 711/103 |
| 2016/0225459 A1* | 8/2016 | Boysan .................... | G11C 5/14 |
| 2016/0364337 A1 | 12/2016 | Hale et al. | |
| 2017/0060668 A1* | 3/2017 | Farhan ................ | G06F 12/0804 |
| 2018/0107603 A1 | 4/2018 | Hale et al. | |
| 2019/0042444 A1 | 2/2019 | Natarajan et al. | |

* cited by examiner

*Primary Examiner* — Khoa D Doan
(74) *Attorney, Agent, or Firm* — Compass IP Law PC

(57) ABSTRACT

A solid state drive (SSD) includes different segments of nonvolatile (NV) storage media with different access times. The NV media segment with faster access time operates as a cache for the segment with the slower access time. The SSD implements idle eviction from the cache segment to the other segment based on an idle condition of the SSD. The SSD can dynamically change application of the idle eviction based on a power management state indicated for the hardware platform. Thus, a change in power management state of the hardware platform associated with the SSD can cause the SSD to implement idle eviction differently.

20 Claims, 9 Drawing Sheets

TABLE 500

| | MODE | PERFORMANCE | POWER SAVER |
|---|---|---|---|
| 502 | PWR_FLG | 0 | 1 |
| 504 | MINIMUM PAGES TO EVICT PER MOVE | 5 | 5 |
| 506 | PWR_PS3 | 1 | 1 |
| 508 | PERF_PS3 | 80 | 80 |
| 510 | PWR_PS4 | 1 | 1 |
| 512 | PERF_PS4 | 100 | 100 |
| 514 | PS3_EVICT | 80 | 1 |
| 516 | PS4_EVICT | 100 | 1 |
| 518 | # PAGES EVICTED BEFORE GOING TO PS3 | 400 | 5 |
| 520 | # PAGES EVICTED BEFORE GOING TO PS4 | 500 | 5 |

FIG. 5A

TABLE 530

| | MODE | PERFOR-MANCE | BATTERY L1 | BATTERY L2 | POWER SAVER |
|---|---|---|---|---|---|
| 532 | PWR_FLG | 00 | 01 | 10 | 11 |
| 534 | MINIMUM PAGES TO EVICT PER MOVE | 5 | 5 | 5 | 5 |
| 536 | PWR_PS3 | 1 | 1 | 1 | 1 |
| 538 | PERF_PS3 | 80 | 80 | 80 | 80 |
| 540 | PWR_PS4 | 1 | 1 | 1 | 1 |
| 542 | PERF_PS4 | 100 | 100 | 100 | 100 |
| 544 | PS3_EVICT | 80 | 60 | 40 | 1 |
| 546 | PS4_EVICT | 100 | 75 | 50 | 1 |
| 548 | # PAGES EVICTED BEFORE GOING TO PS3 | 400 | 300 | 200 | 5 |
| 550 | # PAGES EVICTED BEFORE GOING TO PS4 | 500 | 375 | 250 | 5 |

FIG. 5B

ADAPTIVE CALIBRATION OF NONVOLATILE MEMORY CHANNEL BASED ON PLATFORM POWER MANAGEMENT STATE

FIELD

Descriptions are generally related to solid state storage systems, and more particular descriptions are related to adaptive calibration of an operating parameter of the solid state storage based on a state of the system in which the storage is incorporated.

BACKGROUND

Nonvolatile or long-term storage on a computing device, referring to storage that can maintain data even when power is interrupted to the system, has been dominated for many years by spinning platter storage media. The technologies related to spinning platter have continued to advance, but there are still drawbacks to spinning disk storage.

Long term storage provided by semiconductor-based chips, packaged together as solid state drives or disks (SSDs) has been gaining in popularity. However, its costs are still relatively high on the basis of storage per unit cost, relative to spinning disks. To reduce SSD cost, new technologies have been introduced to pack more bits per cell, providing higher densities of storage per unit area in the drive. There is currently a tradeoff with solid state disks in that increasing the density of solid state media tends to degrade the performance. Thus, increased densities and overall storage capacity has come at the cost of reduced performance in terms of access time.

SSDs have been designed to have a front end buffer or cache to buffer the slower access to the backend media. It will be understood that the buffer works most effectively when the system frees it up as efficiently as possible. When the buffer is full, the backend access time will dominate the performance, but simply executing a constant flush of the buffer to the backend is not necessarily the most efficient because cache eviction consumes power. Configuring the system with a caching portion, and providing mechanisms to flush the buffer or evict the contents of the frontend to the backend can address the access time issue, but may shift the tradeoff between density and performance to a tradeoff between power and performance.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

FIG. 5A is a table representation of an example of adaptive idle eviction thresholds for power saving and performance states.

FIG. 5B is a table representation of an example of adaptive idle eviction thresholds for power saving and performance states, and battery level states.

Figure 1A:
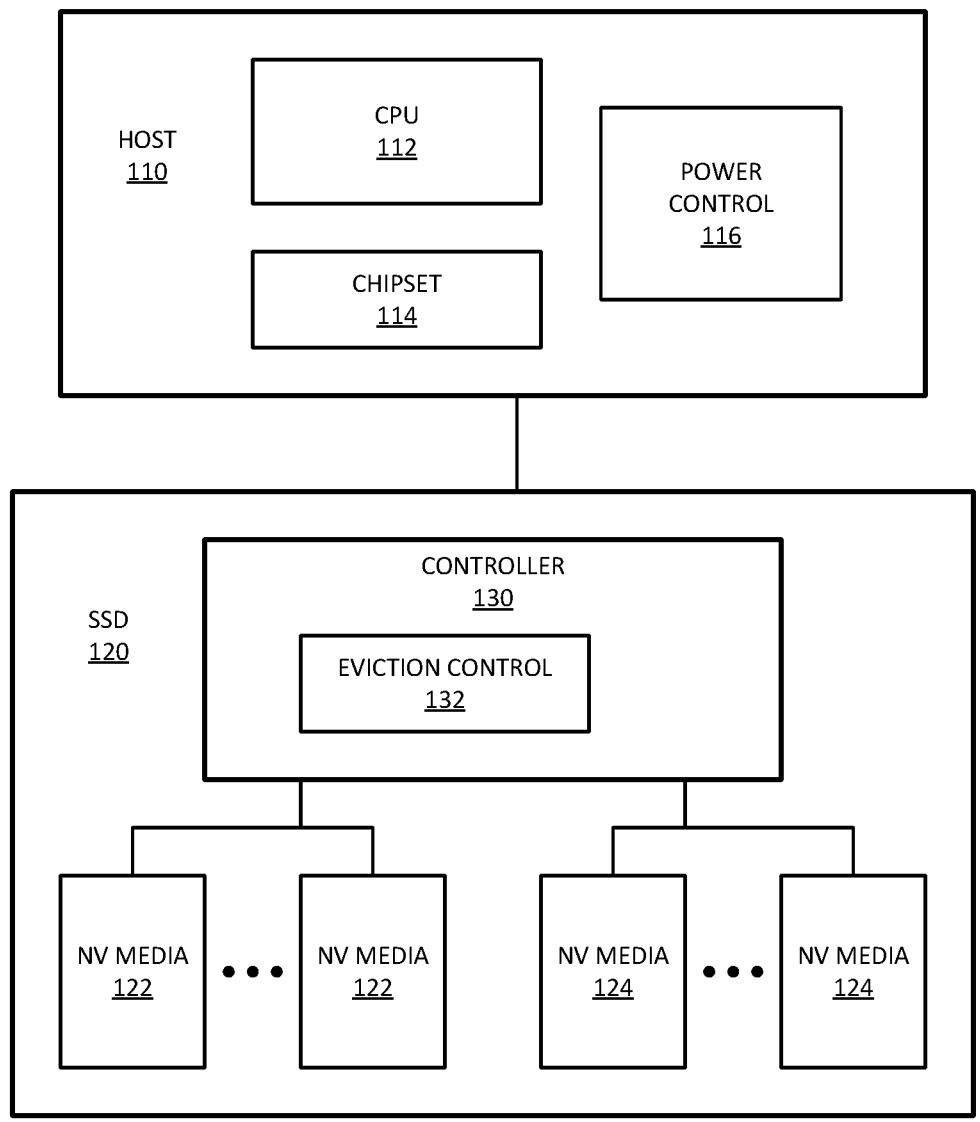
FIG. 1A is a block diagram of an example of a system with a solid state drive (SSD) with a controller that has adaptive idle eviction control.

Descriptions of certain details and implementations follow, including non-limiting descriptions of the figures, which may depict some or all examples, and well as other potential implementations.

DETAILED DESCRIPTION

As described herein, a solid state drive (SSD) includes different segments of nonvolatile (NV) storage media with different access times. The NV media segment with faster access time operates as a buffer or cache for the segment with the slower access time. The SSD implements idle eviction from the faster cache segment to the slower, larger segment based on an idle condition of the SSD. The SSD can dynamically change application of the idle eviction based on a power management state indicated for the hardware platform that the SSD couples to. Thus, a change in power management state of the hardware platform associated with the SSD can cause the SSD to implement idle eviction differently.

By adjusting the idle eviction of the SSD, the SSD can manage the tradeoff between performance and power, while implementing the buffering that manages the tradeoff between performance and bit density. Thus, the SSD can have higher density media and still manage the power tradeoff with an adaptive idle eviction policy.

Idle eviction refers to a policy or mechanism or a combination to evict contents from the cache or buffer portion of the SSD to the slower portion of the SSD when the device goes idle. Other eviction policies can be implemented when the device is actively being used. Idle eviction is specifically for the situation where the drive is put into a lower power state to conserve system power. Drives typically go in and out of idle state to conserve power, and is idle when the power is cut off or reduced and there is no work for the drive to perform.

Traditional idle eviction indicates that when an SSD enters idle, the cache is evicted to commit all the contents back to the primary storage media (i.e., the slower media). The idle eviction policy impacts power performance differently depending on the types of media used in the device. For example, some SSDs use technology that store data in single level cells (SLCs) as a faster, smaller portion of the SSD, while using other technologies as a primary storage media. The other technology can be, for example, triple level cell (TLC) storage or quad level cell (QLC) storage. However, QLC has a significantly slower access time than TLC, which will result in a correspondingly longer eviction time or time needed to perform the eviction. The eviction time for QLC may be approximately four times (4×) longer than for TLC. Thus, a static idle eviction mechanism configured for performance will have a significant impact on power, and an eviction mechanism configured for power can have a significant impact on performance. Additionally, different systems and different system configurations may be better served by different idle eviction mechanisms, and would thus need to be configured separately.

Traditionally, the idle eviction for SSDs has been static. A static idle eviction mechanism refers to a mechanism that is fixed regardless of system configuration. The adaptive idle eviction herein is dynamic, and can address different implementations and different scenarios of use for the SSD. For example, the system can respond dynamically to different configurations, such as desktop deployment versus laptop or tablet deployment, battery power versus plugged in, operating system (OS) performance state, percentage of available battery, or other configuration considerations, or a combination of these. By having the idle eviction respond to computing platform power management state, the idle eviction can respond to power versus performance best suited for the particular implementation.

SSDs can implement various interconnections, such as PCIe (peripheral component interconnect express) or NVMe (nonvolatile memory express). PCIe can be, for example, in accordance with PCI Express Base Specification Revision 4.0, Version 1.0, released Oct. 5, 2017 by PCI-SIG, or other specification, or a variant. NVMe can be, for example, in accordance with NVM Express, Revision 1.3a, released Oct. 24, 2017, by the NVM Express, Inc., or other specification, or a variant. Both interconnections provide for the implementation of idle eviction in low power states. Examples of low power states can include PS3 (power state 3) and PS4 (power state 4), which can be a low power state or sleep state for INTEL-based processors. Other low power states are possible. In general the descriptions apply to a low power state or idle state where idle eviction is implemented. An idle state refers to a state where there is no activity on the drive and the drive is in a low power or lowest power state.

The dynamic buffer eviction overcomes limitations of idle eviction in that the dynamic buffer eviction policy can dynamically change based on system settings. In one example, the system can send the information about its current state to the drive and the drive can change its buffer eviction policy accordingly. In one example, the idle eviction can adapt in accordance with one of two modes.

A first mode can be a performance mode, and the second mode can be a power saver mode. In one example, a power setting in the OS is set to a performance mode, and the system can send information to prioritize performance in response to such a setting. A performance mode can be, for example, if the system is plugged in or if the battery full or nearly full. Prioritizing performance can trigger the drive to evict more buffer data to slower media during low power state transition.

In one example, a power setting in the OS is set to a power saver mode, and the system can send information to prioritize power savings in response to such a setting. A power saver mode can be, for example, if the battery is low or if longer battery time is needed. Prioritizing power savings can trigger the drive to enter low power state as soon as possible with minimal data eviction from buffer.

FIG. 1A is a block diagram of an example of a system with a solid state drive (SSD) with a controller that has adaptive idle eviction control. System 102 includes SSD 120 coupled with host 110. Host 110 represents a host hardware platform that connects to SSD 120. Host 110 includes CPU (central processing unit) 112 or other processor as a host processor. CPU 112 represents any host processor that generates requests to access data stored on 120, either to read the data or to write data to the storage. Such a processor can include a single or multicore processor, a primary processor for a computing device, a graphics processor, a peripheral processor, or a supplemental or auxiliary processor, or a combination. CPU 112 can execute a host OS and other applications to cause the operation of system 102.

Host 110 includes chipset 114, which represents hardware components that can be included in connecting between CPU 112 and SSD 120. For example, chipset 114 can include interconnect circuits and logic to enable access to SSD 120. Thus, host platform 110 can include a hardware platform drive interconnect to couple SSD 120 to host 110. Host 110 includes hardware to interconnect to the SSD. Likewise, SSD 120 includes corresponding hardware to interconnect to host 110. In one example, chipset 114 includes a storage controller, which is a host-side controller that is separate from controller 130 within SSD 120.

SSD 120 represents a solid state drive that includes two types of nonvolatile (NV) media to store data. NV media 122 represents a smaller, faster NV media to act as a buffer or cache for NV media 124. NV media 124 is the primary media for SSD 120. NV media 122 can be considered a first segment of NV media, and NV media 124 can be considered a second segment of NV media. In one example, NV media 122 includes SLC flash memory. In one example, NV media 124 includes TLC flash memory. In one example, NV media 124 includes QLC flash memory.

SSD 120 includes controller 130 to control access to NV media 122 and NV media 124. Controller 130 represents hardware and control logic within SSD 120 to execute control over the media, including eviction control. In one example, controller 130 includes an interface to NV media 122, and includes an interface to host 110. Controller 130 is specifically illustrated to include eviction control 132, which represents hardware and control logic to control the eviction from NV media 122 to NV media 124. Eviction control 132 can be responsive to power control 116 of host 110. Power control 116 represents logic within the host that identifies the power state or power management state of host 110. Eviction control 132 can adaptively change eviction policy based on a power state indicated by power control 116. In one example, eviction control 132 sends a request to host 110 for a power management state indication or a power state indication. Host 110 can respond to the request to provide the requested indication based on a state of power control 116.

Eviction control 132 can enable managing eviction behavior of system 102 on the fly. Managing the eviction behavior on the fly enables the management of the balance between power and performance. The adaptive or dynamic behavior of eviction control 132 allows same SSD usage across different types of systems without hardcoded configuration. The dynamic behavior of eviction control 132 enables the implementation of a QLC based SSD, even though QLC may be more than an order of magnitude slower than SLC. Eviction control 132 can manage the bottleneck of an SSD that created by higher density storage technology, or a system where the primary media portion is significantly slower than the buffer portion.

In addition to responding to the power state of host 110, eviction control 132 works based on the idle state of SSD 120, in accordance with normal operation. Instead of performing idle eviction only based on the idle state of SSD 120, such as with a fixed eviction policy, eviction control 132 can adjust or change the application of idle eviction based on information from or about power control 116.

Figure 1B:
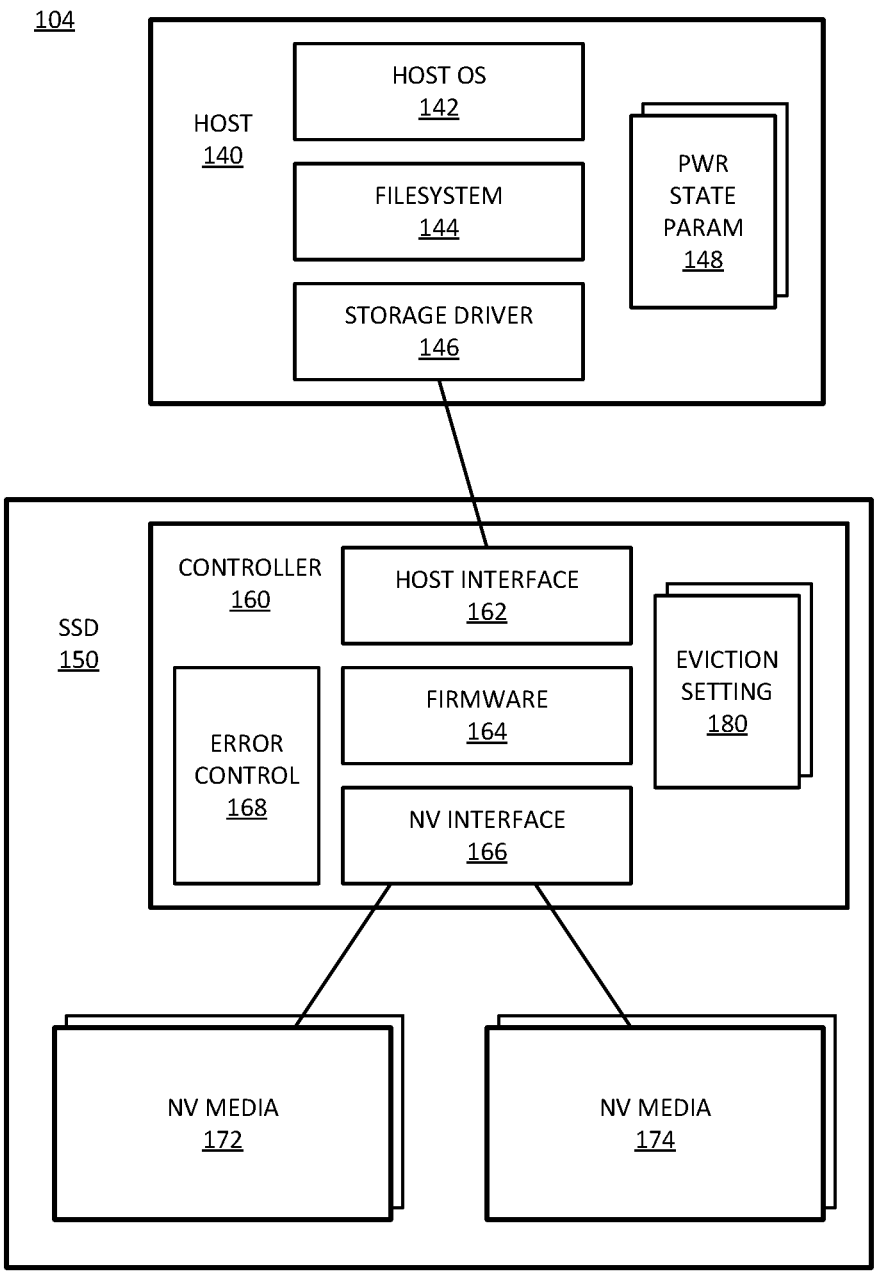
FIG. 1B is a block diagram of an example of a system with a solid state drive (SSD) with a controller with programmable firmware to implement adaptive idle eviction control.

FIG. 1B is a block diagram of an example of a system with a solid state drive (SSD) with a controller with programmable firmware to implement adaptive idle eviction control. System 104 provides one example of a system in accordance with system 102 of FIG. 1A. System 104 illustrates the logical layers of the host and SSD of a hardware platform in accordance with system 102. System 104 can represent software and firmware components of an example of system 102, as well as physical components. In one example, host 140 provides one example of host 110. In one example, SSD 150 provides one example of SSD 120.

In one example, host 140 includes host OS 142, which represents a host operating system or software platform for the host. Host OS 142 can include a platform on which applications, services, agents, and/or other software executes, and is executed by a processor. Filesystem 144 represents control logic for controlling access to the NV media. Filesystem 144 can manage what addresses or memory locations are used to store what data. There are numerous filesystems known, and filesystem 144 can implement known filesystems or other proprietary systems. In one example, filesystem 144 is part of host OS 142.

Storage driver 146 represents one or more system-level modules that control the hardware of host 140. In one example, drivers 146 include a software application to control the interface to SSD 150, and thus control the hardware of SSD 150. Storage driver 146 can provide a communication interface between the host and the SSD.

Controller 160 of SSD 150 includes firmware 164, which represents control software/firmware for the controller. In one example, controller 160 includes host interface 162, which represents an interface to host 150. In one example, controller 160 includes NV interface 166, which represents an interface to NV media device(s) 170. Interfaces 162 and 166 represent control that is executed on hardware of controller 160. It will be understood that controller 160 includes hardware to interface with host 140, which can be considered to be controlled by host interface software/firmware 162. Likewise, it will be understood that controller 160 includes hardware to interface with NV media 170. In one example, code for host interface 162 can be part of firmware 164. In one example, code for NV interface 166 can be part of firmware 164.

Firmware 164 controls the hardware interfaces to enable communication. In one example, firmware 164 includes a storage controller that performs continuous checkpointing in accordance with what is described above. It will be understood that more hardware implementation within controller 160 will increase the speed of operation of the SSD. Thus, command sequences can be implemented in firmware (e.g., firmware 164 or NV interface 166), but firmware is generally slower than hardware. Firmware is more flexible because it can perform more operations and be modified, but hardware is generally much faster than firmware implementations. It will be understood that there are aspects of interaction that are handled in firmware in all cases, seeing that the firmware controls the hardware. However, firmware implementation refers to an implementation in which all sequencing and all processing of signals is performed in firmware controlled logic. A hardware implementation includes hardware processing of at least some of the signal exchanges. Firmware control over the hardware needs to be compatible with both the hardware interface of controller 160, as well as the hardware and firmware of NV device 170.

An example of hardware versus firmware can be represented by error control 168. Error control 168 handles data errors in accessed data, and corner cases in terms of compliance with signaling and communication interfacing. It is possible to implement at least some of error control in hardware. However, most error control is implemented in firmware for the flexibility, even if it is slower than a hardware implementation. A hardware implementation may require an impractical amount of hardware logic to implement. Similarly, in one example, firmware 164 handles erase operations and drive cleanup procedures.

NV media 170 represents a nonvolatile device in accordance with any embodiment described herein. In one example, NV media 170 includes NV media 172, which can be a buffer portion of nonvolatile media, to buffer access to NV media 174 as the primary storage media. In one example, either or both of NV media 172 and NV media 174 can include buffer components, such as implemented by volatile memory, as input or output buffers or caches to store temporary data for exchange with controller 160. The use of caching within the NV media can enable receiving commands asynchronously, while allowing the operation of and responding to commands synchronously. The timing can be made synchronous by buffering the data in the cache. NV media 172 can provide a similar function for NV media 174 to buffer the delay in accessing NV media 174, which has a slower access time than NV media 172.

In one example, firmware 164 implements logic for a storage controller that performs dynamic idle eviction. In one example, controller 160 includes one or more eviction settings 180. Eviction settings 180 can indicate eviction thresholds, how many pages to evict in an operation, how many eviction operations to perform, or other settings, or a combination of settings. In one example, firmware 164 dynamically updates one or more settings based on a power state parameter (pwr state param) 148. In one example, eviction settings 180 includes multiple alternative settings, and firmware 164 selects eviction settings based on a power state parameter 148.

Power state parameter represents one or more settings to indicate a state of host 140. Eviction settings 180 can indicate idle eviction operation between NV media 172 and NV media 174 depending on the power state or the idle state of SSD 150, based on whether SSD 150 is in idle state or not. In addition to the state of SSD 150, firmware 164 can dynamically control the eviction operation of SSD 150 based on the state of host 140.

In a traditional operation, SSD 150, for example implemented as either a PCIe or NVMe SSD, will enter idle eviction mode when there are no outstanding I/O (input/output) commands in an I/O queue (not specifically shown), and when an idle timer (not specifically shown) has expired (e.g., after X milliseconds (mS)). During the idle eviction, firmware 164 can move data from faster NV media 172 to slower media 174 before transitioning to low power states (e.g., logical PS3 state or logical PS4 state). In system 104, in one example, firmware 164 dynamically manages the idle eviction process based on the system preference of host 140.

In one example, firmware 164 includes a logic change relative to traditional SSD firmware, which enables the firmware to dynamically change the idle eviction policy, or select from different idle eviction policies, which can dynamically change based on system preference or system state. In one example, system 104 includes changes to firmware 164 and storage driver 146 to provide one or more vendor unique (VU) or vendor specific (VS) commands. Standards such as PCIe and NVMe provide for VS commands to enable different vendors to provide customized commands for custom functionality. VS commands can enable establishing communication between storage driver 146 and SSD 150. In one example, storage driver 146 includes one or more modifications relative to traditional storage drivers to notify SSD 150 about the system preference or the system power state. For example, storage driver 146 can generate a flag or signal indication of power state parameters 148, or send one or more power state parameters 148 to SSD 150 to cause the SSD to change idle eviction.

Figure 2:
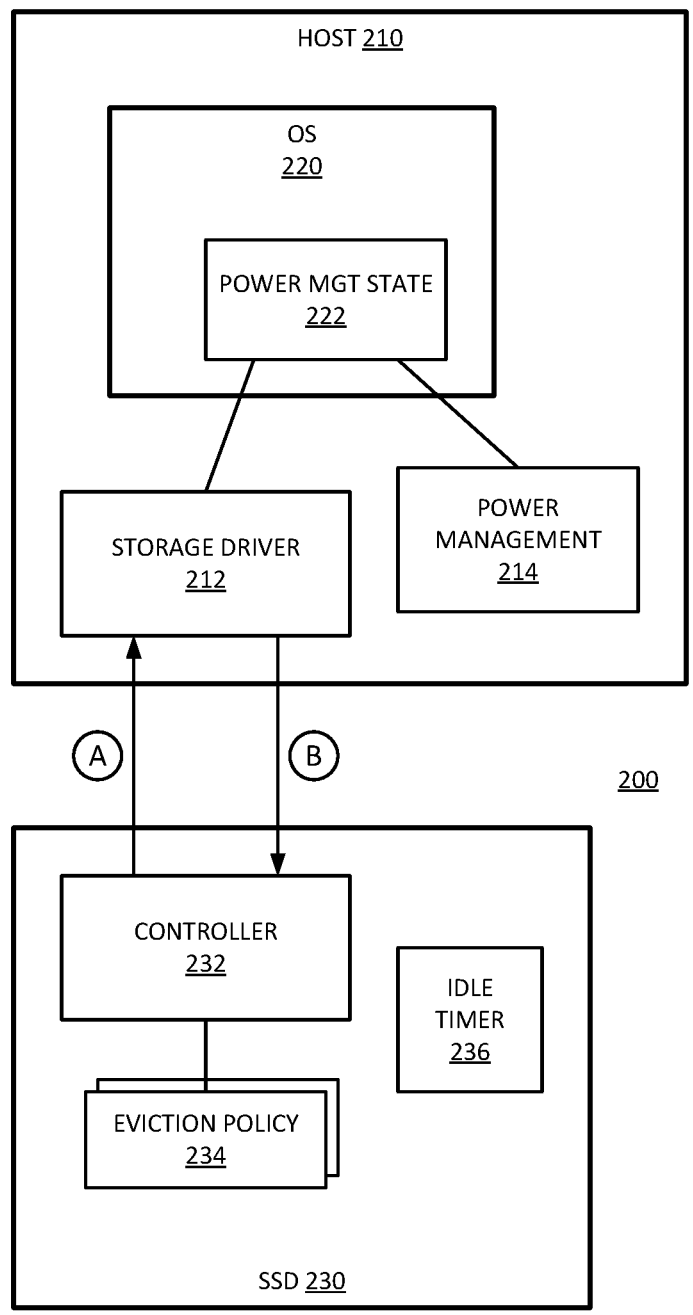
FIG. 2 is a block diagram of an example of an exchange between a host and a solid state drive (SSD) to implement adaptive idle eviction.

FIG. 2 is a block diagram of an example of an exchange between a host and a solid state drive (SSD) to implement adaptive idle eviction. System 200 provides an example of a system in accordance with system 102 of FIG. 1A or system 104 of FIG. 1B. System 200 includes host 210 coupled to SSD 230. System 200 illustrates a communication exchange between host 210 and SSD 230 related to idle eviction.

Host 210 includes a processor to execute OS 220. In one example, OS 220 includes power management (mgt) state 222. Power management state 222 represents a state of the hardware platform to which SSD 230 is connected. Power management state 222 can be set by power management hardware 214. Power management 214 represents hardware in host 210 to distribute, monitor, and control the power in host 210, as well as in SSD 230. For example, SSD 230 can be powered by power management hardware on the host. In lower power states, OS 220 can reduce the operation of one or more components of the hardware system to conserve power. Based on a communication exchange of power management state information, SSD 230 can change idle eviction to operate differently to conserve more power.

Storage driver 212 represents hardware and firmware to interface with SSD 230. In one example, storage driver 212 interfaces with controller 232, which represents a processor, controller, or hardware logic of SSD 230 to manage data access requests and manage access to storage media (not specifically shown in system 200). SSD 230 includes primary storage media and a faster storage media that buffers access to the slower primary storage media.

In one example, controller 232 control idle eviction in accordance with one or more eviction policies 234. Eviction policy 234 represents one or more configuration settings to determine the behavior or the operation of eviction from the caching media to the primary storage media. In one example, storage driver 212 generates a flag or an indication signal to send to controller 232. In response to the flag or indication signal, controller 232 can adjust eviction based on an eviction policy 234. Idle timer 236 represents a timer in SSD 230 to determine when a threshold amount of time has passed between accesses. In response to a timer event, controller 232 can trigger SSD 230 to enter an idle state. In the idle state, or transitioning into the idle state, the idle the eviction can be controlled by eviction policy 234. In one example, controller 232 triggers an autonomous power state transition (APST) in response to a timer event.

In one example, controller 232 generates a request for power state information. Controller 232 sends the request at point 'A' to storage driver 212. In one example, the request is in accordance with a VS command. In one example, controller 232 sends the commands as an asynchronous request to host 210 when idle timer 236 starts. In one example, storage driver 212 will recognize the event of the command and idle timer start, and respond with a new VS command to provide power state information. In one example, the power state information is represented as a single bit value of a pwr_flg. In one example, the power state information is represented as multiple bits of a pwr_flg. Point 'B' represents the response by storage driver 212 to the request of point 'A'.

In one example of system 200, controller 232 determines power state to select an eviction policy 234 based on power management state information sent by storage driver 212, which can be the host-side SSD controller. In one example, controller 232 sends a request for the state information from storage driver 212. Controller 232 can be considered an internal controller to SSD 230, being internal to the SSD.

Figure 3:
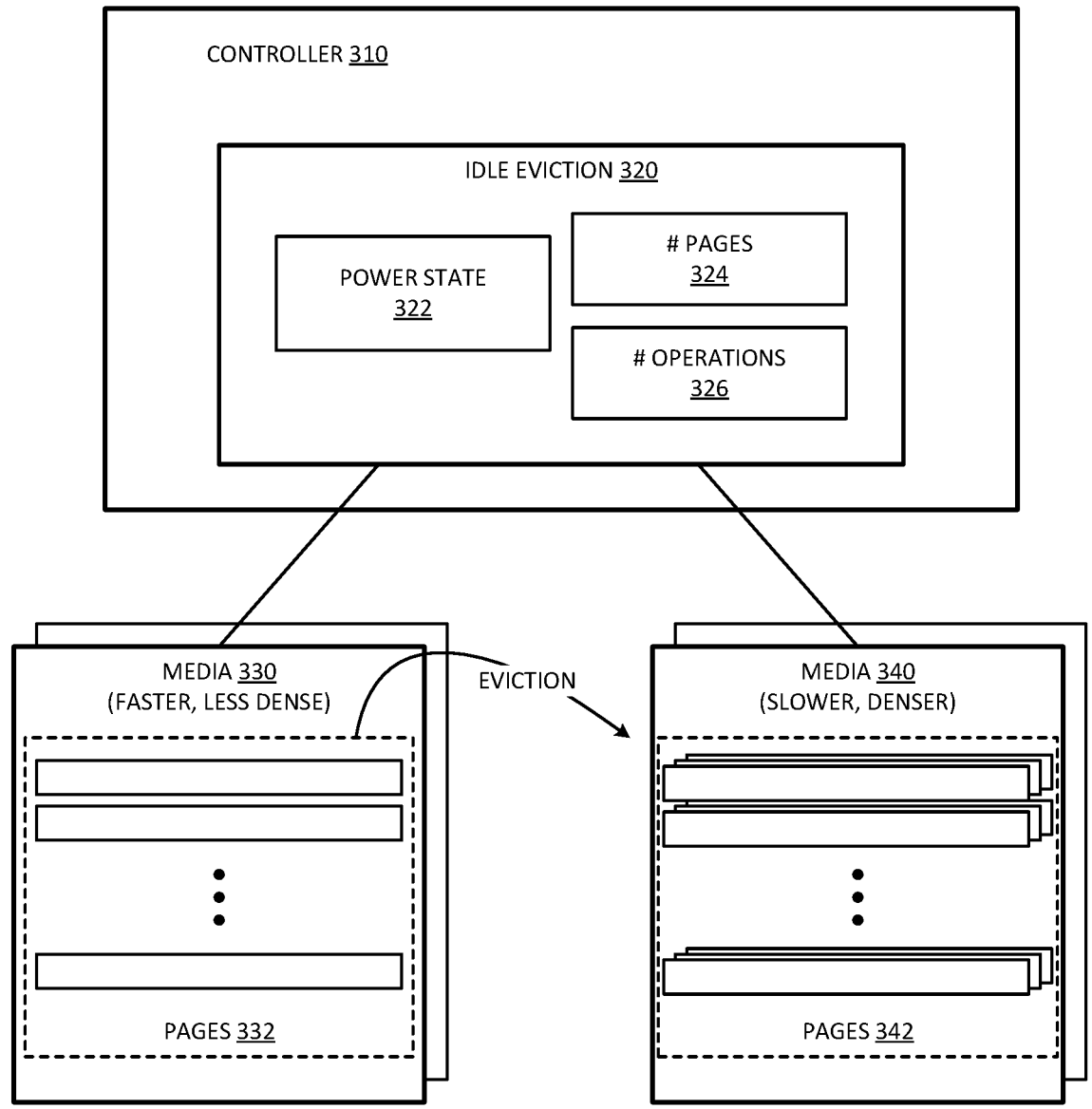
FIG. 3 is a block diagram of an example of a system with a nonvolatile drive controller having adaptive idle eviction control.

FIG. 3 is a block diagram of an example of a system with a nonvolatile drive controller having adaptive idle eviction control. System 300 represents an example of an SSD that implements dynamic idle eviction in accordance with any example described herein. System 300 includes controller 310, which is a controller internal to the SSD. Controller 310 interfaces with media 340, which is a slower, denser storage media that acts as the primary storage media device or portion. Controller 310 interfaces with media 330, which is a faster, less dense media than media 340, and operates as a buffer portion, to buffer access requests to the SSD, which will ultimately be stored on media 340. An access request can include a read access request. An access request can include a write or store access request.

In one example, controller 310 includes or executes idle eviction logic 320. Idle eviction 320 represents control components for implementing idle eviction. In one example, idle eviction 320 includes power state information 322 to determine a state of the associated host platform (not specifically shown). The power state can be provided by the host to controller 310 in accordance with any example provided herein.

In one example, idle eviction 320 includes one or more settings or fields to indicate a number of pages 324 to transfer in an idle eviction operation. In response to an idle timer event (e.g., identifying an idle condition), controller 310 can trigger the SSD to transition to an idle state. Part of the idle state transition can be clearing out the buffer of media 330 to media 340. It will be understood that since both media 330 and media 340 are both nonvolatile media, disruption of power due to idle state or other power disruption will not result in a loss of data state. However, clearing media 330 can free up buffer space in media 330. When media 330 fills up, the timing of access to media 340 will control the overall access time, degrading performance.

In one example, idle eviction 320 includes setting or field 326 to indicate a number of operations to perform in idle eviction, based on power state 322. In one example, idle eviction 320 includes both setting or field 324 for the number of pages, as well as setting or field 326 for the number of operations, as programmable values. Thus, either or both of number of pages 324 and number of operations 326 can be dynamically configurable based on power state 322. Idle eviction can include the transfer of contents from pages 332 of media 330 to pages 342 of media 340. It will be understood that the number of pages 342 is greater than the number of pages 332, when considering the multiple levels for each storage cell.

In one example, power state 322 can represent a binary state, such as a performance state and a power save state. In one example, power state 322 represents one of multiple states, which can include a performance state, a power save state, and one or more additional states. For example, one or more additional states can be triggered in response to a battery level indication for the host platform.

Figure 4:
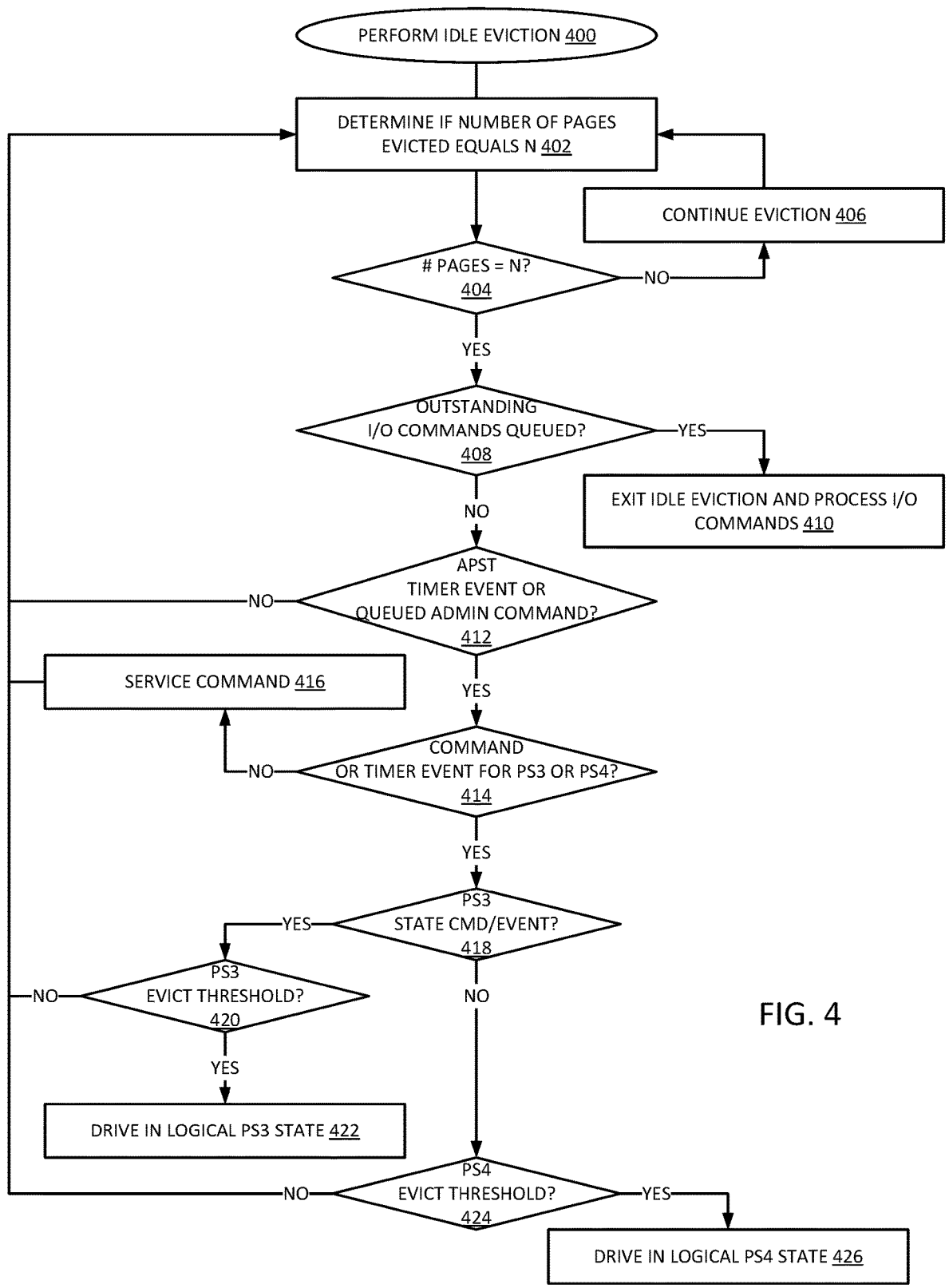
FIG. 4 is a flow diagram of an example of a process for adaptive idle eviction.

FIG. 4 is a flow diagram of an example of a process for adaptive idle eviction. Process 400 provides an example of performing idle eviction in accordance with an SSD controller such as controller 130, controller 160, controller 232, or controller 310. Process 400 provides an idle eviction flow that can dynamically change based on system preference or based on system power state. In one example, operations by the controller can be considered operations by firmware.

In one example, the controller can determine if the number of pages evicted equals some number N, 402. In one example, N equals 5. In one example, the number of pages counted refers to super pages, which includes multiple pages accessed together as a block. If the number of pages does not equal N, 404 NO branch, the controller continues the eviction process, 406. If the number of pages is equal to N, 404 YES branch, the threshold number of pages has been reached and the controller can determine if there are outstanding I/O commands queued.

If there are outstanding I/O commands queued, 408 YES branch, in one example the controller will exit idle eviction and process the I/O commands, 410. If there are I/O commands queued, the SSD is not ready to be in an idle state. If there are no outstanding I/O commands queued, 408 NO branch, the controller can determine if there are any outstanding admin commands queued or any APST timer events. If there are no outstanding admin commands and no APST timer events, 412 NO branch, the controller can return to determining if the number of pages evicted equals N, 402.

If there is an outstanding admin command or a timer event, 412 YES branch, the controller can determine if the command or the timer event is for a low power state. If the command or timer event is not related to a low power state, 414 NO branch, the controller can service the command, 416, and return to determining if the number of pages evicted equals N, 402. If the command or timer event is related to a low power state, 414 YES branch, in one example, the controller determines what low power state it is in. The controller can perform idle eviction differently depending on the low power state.

In one example, if the low power state is PS3, 418 YES branch, the controller determines if the PS3 eviction threshold has been reached, 420. If the PS3 evict threshold has been reached, 420 YES branch, the controller can place the drive in a logical PS3 state after performing the selected idle eviction, 422. If the threshold has not been reached, 420 NO branch, the controller can return to determining if the number of pages evicted equals N, 402.

In one example, if the low power state is not PS3, it is PS4. If the PS4 evict threshold has not been reached, 424 NO branch, return to determining if the number of pages evicted equals N, 402. If the PS4 evict threshold has been reached, 424 YES branch, the controller can place the drive in a logical PS4 state, 426.

FIG. 5A is a table representation of an example of adaptive idle eviction thresholds for power saving and performance states. Table 500 represents a table of idle eviction settings to be applied by an SSD, such as by controller 130, controller 160, controller 232, or controller 310. Table 500 provides an example of an implementation where there is a performance state and a power saver state. In one example, table 500 includes columns for Mode, Performance state setting, and Power Saver state setting.

Row 502 is an example of a Pwr_flg setting, where Pwr_flg=0 indicates a Performance state or mode, and Pwr_flg=1 indicates a Power Saver state or mode. The Pwr_flg can be defined by the host power mode configuration. Row 504 is an example of a minimum number of pages to evict per move or per eviction operation. Both performance and power saver are set to moving 5 pages minimum. In one example, a controller for an SSD executes firmware, which can support new configuration settings. The settings can determine the amount of data to be evicted before going into PS3 or PS4 state, and in one example are based on whether the host is in power saver or performance mode.

In one example, table 500 defines values for new threshold configuration settings. Row 506 illustrates a setting for Pwr_PS3, referring to a setting to indicate a minimum number of evict operations to perform prior to entering PS3 (1 in the example provided), where each operation includes the minimum number of pages indicated in row 504. The setting of row 506 can be considered a firmware controlled light switch setting to evict the minimum number of pages before going to PS3 state in power saver mode.

Row 508 illustrates a setting for Perf_PS3, referring to a setting to indicate a minimum number of evict operations to perform prior to entering PS3 in a performance mode (80 in the example provided), where each operation includes the minimum number of pages indicated in row 504. The setting of row 508 can be considered a firmware controlled light switch setting to evict the minimum number of pages before going to PS3 state in performance mode.

Row 510 illustrates a setting for Pwr_PS4, referring to a setting to indicate a minimum number of evict operations to perform prior to entering PS4 (1 in the example provided), where each operation includes the minimum number of pages indicated in row 504. The setting of row 510 can be considered a firmware controlled light switch setting to evict the minimum number of pages before going to PS4 state in power saver mode.

Row 512 illustrates a setting for Perf_PS4, referring to a setting to indicate a minimum number of evict operations to perform prior to entering PS4 in a performance mode (100 in the example provided), where each operation includes the minimum number of pages indicated in row 504. The setting of row 512 can be considered a firmware controlled light switch setting to evict the minimum number of pages before going to PS4 state in performance mode.

In one example, each of the firmware controlled light switch settings are configurable. Configurable settings can be modified to enable the minimum amount of data to be moved for power saver mode and the maximum possible amount of data can be moved for performance mode. A hardware platform can have various power states. Table 500 illustrates a configuration for two states. In one example, if the platform is plugged in, it is typically in the performance state. If it is not plugged in, it can be in a non-performance state, or a power saving state. As an example with response to only two states, the SSD can perform idle eviction during performance state, and does not perform idle eviction when in power saving state.

Row 514 illustrates a setting for PS3_evict, referring to a setting to indicate the threshold for eviction. In one example, the threshold can be calculated as PS3_evict=Pwr_flg*Pwr_PS3+!Pwr_flg*Perf_PS3. The PS3_evict indicates an eviction threshold to move a total number of pages from fast media to slow media before going to PS3 state. Row 516 illustrates a setting for PS4_evict, referring to a setting to indicate the threshold for eviction. In one example, the threshold can be calculated as PS4_evict=Pwr_flg*Pwr_PS4+!Pwr_flg*Perf_PS4. The PS4_evict indicates an eviction threshold to move a total number of pages from fast media to slow media before going to PS4 state.

Row 518 illustrates an example of the number of pages evicted before going into PS3. It is calculated as either the 80 operations or 1 operation for idle eviction per row 508 or 506, respectively, times the 5 pages per move per row 504. The total number of pages in performance mode is 400, and the number of pages in power saver mode is 5.

Row 520 illustrates an example of the number of pages evicted before going into PS4. It is calculated as either the 100 operations or 1 for idle eviction per row 512 or 510, respectively, times the 5 pages per move per row 504. The total number of pages in performance mode is 500, and the number of pages in power saver mode is 5. In one example, the change to the setting for Pwr_flg can change the minimum number of pages to evict during idle eviction. In another example, the application of idle eviction can be modified by changing a setting, such as writing a new value into one of the rows of table 500.

FIG. 5B is a table representation of an example of adaptive idle eviction thresholds for power saving and performance states, and battery level states. Table 530 provides an example of an extension of table 500 of FIG. 5A. Whereas table 500 has a performance mode and a power saver mode, table 530 adds a battery level 1 (L1) mode and a battery level 2 (L2) mode. The components of table 530 relative to the performance mode and the power saver mode are the same as table 500. For completeness, the settings are repeated.

Row 532 is an example of a Pwr_flg setting, where Pwr_flg=00 indicates a Performance state or mode, Pwr_flg=01 indicates a Battery L1 state or mode, Pwr_flg=10 indicates a Battery L2 state or mode, and Pwr_flg=11 indicates a Power Saver state or mode. Row 534 is an example of a minimum number of pages to evict per move or per eviction operation. All settings are set to moving 5 pages minimum, but the settings could be different in different implementations.

Row 536 illustrates a setting for Pwr_PS3, referring to a setting to indicate a minimum number of evict operations to perform prior to entering PS3 (1 in the example provided), where each operation includes the minimum number of pages indicated in row 534. The setting of row 536 can be considered a firmware controlled light switch setting to evict the minimum number of pages before going to PS3 state in power saver mode.

Row 538 illustrates a setting for Perf_PS3, referring to a setting to indicate a minimum number of evict operations to perform prior to entering PS3 in a performance mode (80 in the example provided), where each operation includes the minimum number of pages indicated in row 534. The setting of row 538 can be considered a firmware controlled light switch setting to evict the minimum number of pages before going to PS3 state in performance mode.

Row 540 illustrates a setting for Pwr_PS4, referring to a setting to indicate a minimum number of evict operations to perform prior to entering PS4 (1 in the example provided), where each operation includes the minimum number of pages indicated in row 534. The setting of row 540 can be considered a firmware controlled light switch setting to evict the minimum number of pages before going to PS4 state in power saver mode.

Row 542 illustrates a setting for Perf_PS4, referring to a setting to indicate a minimum number of evict operations to perform prior to entering PS4 in a performance mode (100 in the example provided), where each operation includes the minimum number of pages indicated in row 534. The setting of row 542 can be considered a firmware controlled light switch setting to evict the minimum number of pages before going to PS4 state in performance mode.

As with table 500, in one example, each of the firmware controlled light switch settings of table 530 are configurable. Table 530 illustrates a configuration for four states. In one example, if the platform is plugged in, it is typically in the performance state. If it is not plugged in, it can be in one of multiple non-performance states, depending on the battery level.

Row 544 illustrates a setting for PS3_evict, referring to a setting to indicate the threshold for eviction. In one example, for the Performance and the Power Saver modes the threshold can be calculated as PS3_evict=Pwr_flg*Pwr_PS3+!Pwr_flg*Perf_PS3. For Battery L1, the threshold can be calculated as PS3_evict=Pwr_flg*(0.75)Pwr_PS3+!Pwr_flg*(0.75)Perf_PS3. For Battery L2, the threshold can be calculated as PS3_evict=Pwr_flg*(0.5)Pwr_PS3+!Pwr_flg*(0.5)Perf_PS3. The PS3_evict indicates an eviction threshold to move a total number of pages from fast media to slow media before going to PS3 state.

Row 546 illustrates a setting for PS4_evict, referring to a setting to indicate the threshold for eviction. In one example, for the Performance and the Power Saver modes the threshold can be calculated as PS4_evict=Pwr_flg*Pwr_PS3+!Pwr_flg*Perf_PS4. For Battery L1, the threshold can be calculated as PS4_evict=Pwr_flg*(0.75)Pwr_PS4+!Pwr_flg*(0.75)Perf_PS4. For Battery L2, the threshold can be calculated as PS4_evict=Pwr_flg*(0.5)Pwr_PS4+!Pwr_flg*(0.5)Perf_PS4. The PS4_evict indicates an eviction threshold to move a total number of pages from fast media to slow media before going to PS4 state.

Row 548 illustrates an example of the number of pages evicted before going into PS3. It is calculated as a portion of the 80 operations indicated in row 538, or as 1 operation for idle eviction as indicated in row 536, respectively, times the 5 pages per move as indicated in row 534. The total number of pages in performance mode is 400, the total number of pages in battery L1 mode is 300, the total number of pages in battery L2 mode is 200, and the number of pages in power saver mode is 5.

Row 530 illustrates an example of the number of pages evicted before going into PS4. It is calculated as a portion of the 100 operations indicated in row 542, or as 1 operation for idle eviction as indicated in row 540, respectively, times the 5 pages per move as indicated in row 534. The total number of pages in performance mode is 500, the total number of pages in battery L1 mode is 370, the total number of pages in battery L2 mode is 250, and the number of pages in power saver mode is 5.

In one example, the change to the setting for Pwr_flg can change the minimum number of pages to evict during idle eviction. In another example, the application of idle eviction can be modified by changing a setting, such as writing a new value into one of the rows of table 500.

Figure 6:
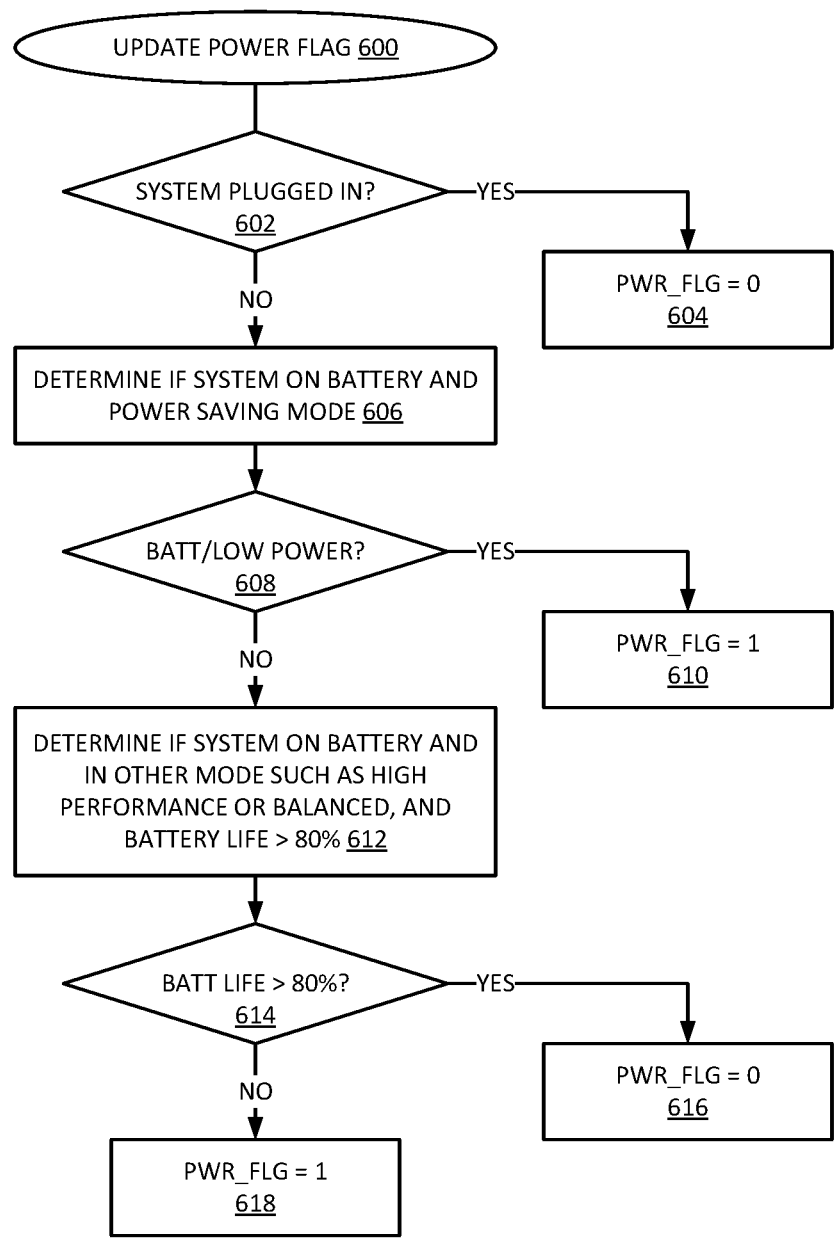
FIG. 6 is a flow diagram of an example of a process for updating a power flag used in adaptive idle eviction.

FIG. 6 is a flow diagram of an example of a process for updating a power flag used in adaptive idle eviction. Process 600 provides an example of updating a value of a power flag provided by a storage driver in accordance with an example described herein, to be used by a controller in accordance with an example described herein. In one example, the storage controller can perform the operations of process 600.

In one example, the OS determines if the system is plugged in. If the system is plugged in, 602 YES branch, in one example, the system sets an indicator Pwr_flg value to zero, 604. The Pwr_flg set to zero can indicate that the power saver mode setting is not to be used, while a one value can indicate the use of a power saver mode setting. If the system is not plugged in, 602 NO branch, in one example, system determines if the system is on battery and the power saving mode is set, 606.

If the system in on battery power and the power saver mode is on, 608 YES branch, in one example, the system sets Pwr_flg equal to one to cause a power saver setting to be used, 610. If the system is on battery power, but the low power mode is not on, 608 NO branch, the system can determine if the system is in another mode, such as high performance mode, or balanced mode, and the battery life is still above a certain percentage, 612.

In one example, if the system has battery power above a threshold (e.g., 80%, or a different value configured for the system), 614 YES branch, the system can set the Pwr_flg to zero, 616. In one example, if the system has battery power below the threshold, 614 NO branch, the system can set the Pwr_flg to one, 618. It will be understood that process 600 is directed to an implementation where two power flag states are used, corresponding to a performance state and a power saver state. Other implementations can use similar, but more complex logic to determine one of multiple settings for the power state indicator.

Figure 7:
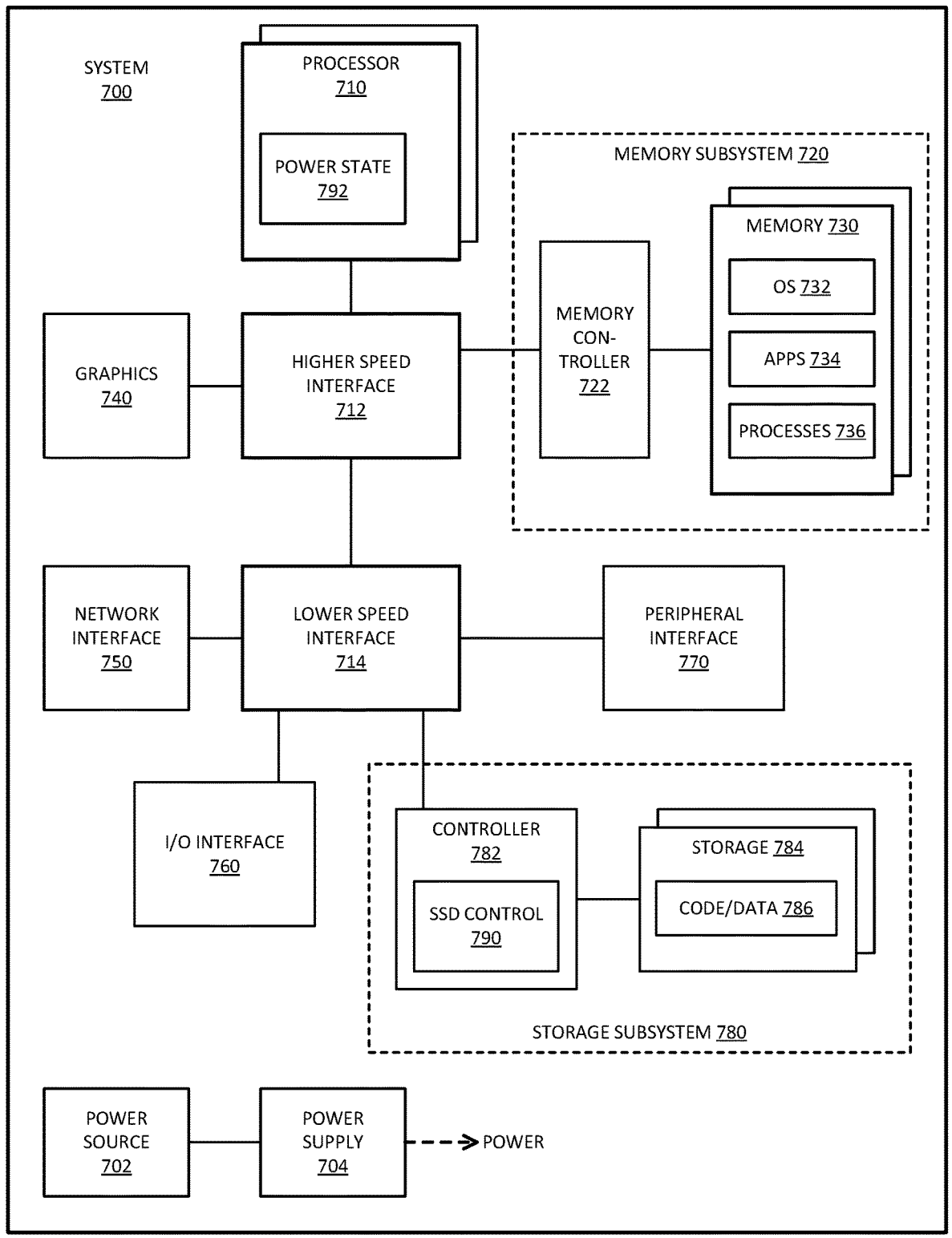
FIG. 7 is a block diagram of an example of a computing system in which adaptive idle eviction can be implemented.

FIG. 7 is a block diagram of an example of a computing system in which adaptive idle eviction can be implemented. System 700 represents a computing device in accordance with any example herein, and can be a laptop computer, a desktop computer, a tablet computer, a server, a gaming or entertainment control system, a scanner, copier, printer, routing or switching device, embedded computing device, a smartphone, a wearable device, an internet-of-things device or other electronic device.

In one example, system 700 includes SSD control 790. SSD control 790 includes an SSD controller that can perform adaptive idle eviction in accordance with any example provided herein. SSD control 790 can change idle eviction policy based on a power state of system 700, as indicated by power state 792. Power state 792 can be part of an OS executed by processor 710. A change in power state in the host operating system can indicate a change in system preference.

System 700 includes processor 710, which provides processing, operation management, and execution of instructions for system 700. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 700 includes interface 712 coupled to processor 710, which can represent a higher speed interface or a high throughput interface for system components that needs higher bandwidth connections, such as memory subsystem 720 or graphics interface components 740. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater, and can include formats such as full HD (e.g., 1080p), retina displays, 4K (ultra high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Memory subsystem 720 represents the main memory of system 700, and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus.

In one example, system 700 includes interface 714, which can be coupled to interface 712. Interface 714 can be a lower speed interface than interface 712. In one example, interface 714 represents an interface circuit, which can include standalone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can exchange data with a remote device, which can include sending data stored in memory or receiving data to be stored in memory.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data 786 in a persistent state (i.e., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (i.e., the value or state of the data is indeterminate if power is interrupted to system 700). In one example, storage subsystem 780 includes controller 782 to interface with storage 784. In one example controller 782 is a physical part of interface 714 or processor 710, or can include circuits or logic in both processor 710 and interface 714.

Power source 702 provides power to the components of system 700. More specifically, power source 702 typically interfaces to one or multiple power supplies 704 in system 702 to provide power to the components of system 700. In one example, power supply 704 includes an AC to DC (alternating current to direct current) adapter to plug into a wall outlet. Such AC power can be renewable energy (e.g., solar power) power source 702. In one example, power source 702 includes a DC power source, such as an external AC to DC converter. In one example, power source 702 or power supply 704 includes wireless charging hardware to charge via proximity to a charging field. In one example, power source 702 can include an internal battery or fuel cell source.

Figure 8:
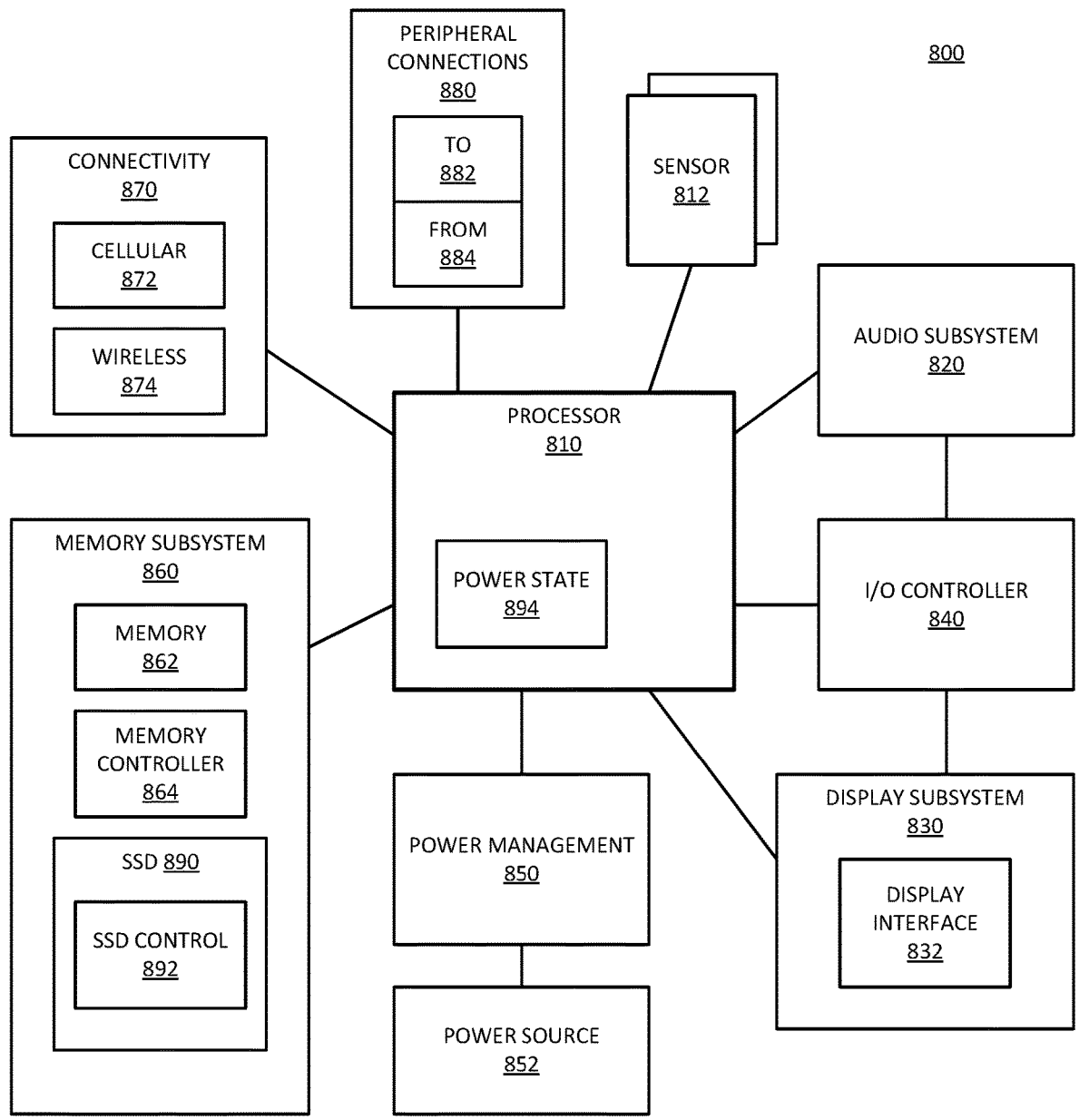
FIG. 8 is a block diagram of an example of a mobile device in which adaptive idle eviction can be implemented.

FIG. 8 is a block diagram of an example of a mobile device in which adaptive idle eviction can be implemented. Device 800 represents a mobile computing device, such as a computing tablet, a mobile phone or smartphone, a wireless-enabled e-reader, wearable computing device, an internet-of-things device or other mobile device, or an embedded computing device. It will be understood that certain of the components are shown generally, and not all components of such a device are shown in device 800.

In one example, system 800 includes SSD 890, which in turn includes SSD control 892. SSD control 892 includes an SSD controller that can perform adaptive idle eviction in accordance with any example provided herein. SSD control 892 can change idle eviction policy based on a power state of system 800, as indicated by power state 894. Power state 894 can be part of an OS executed by processor 810. A change in power state in the host operating system can indicate a change in system preference.

Device 800 includes processor 810, which performs the primary processing operations of device 800. Processor 810 can include one or more physical devices, such as microprocessors, application processors, microcontrollers, programmable logic devices, or other processing means. The processing operations performed by processor 810 include the execution of an operating platform or operating system on which applications and device functions are executed. The processing operations include operations related to I/O (input/output) with a human user or with other devices, operations related to power management, operations related to connecting device 800 to another device, or a combination. The processing operations can also include operations related to audio I/O, display I/O, or other interfacing, or a combination. Processor 810 can execute data stored in memory. Processor 810 can write or edit data stored in memory.

In one example, system 800 includes one or more sensors 812. Sensors 812 represent embedded sensors or interfaces to external sensors, or a combination. Sensors 812 enable system 800 to monitor or detect one or more conditions of an environment or a device in which system 800 is implemented. Sensors 812 can include environmental sensors (such as temperature sensors, motion detectors, light detectors, cameras, chemical sensors (e.g., carbon monoxide, carbon dioxide, or other chemical sensors)), pressure sensors, accelerometers, gyroscopes, medical or physiology sensors (e.g., biosensors, heart rate monitors, or other sensors to detect physiological attributes), or other sensors, or a combination. Sensors 812 can also include sensors for biometric systems such as fingerprint recognition systems, face detection or recognition systems, or other systems that detect or recognize user features. Sensors 812 should be understood broadly, and not limiting on the many different types of sensors that could be implemented with system 800. In one example, one or more sensors 812 couples to processor 810 via a frontend circuit integrated with processor 810. In one example, one or more sensors 812 couples to processor 810 via another component of system 800.

In one example, device 800 includes audio subsystem 820, which represents hardware (e.g., audio hardware and audio circuits) and software (e.g., drivers, codecs) components associated with providing audio functions to the computing device. Audio functions can include speaker or headphone output, as well as microphone input. Devices for such functions can be integrated into device 800, or connected to device 800. In one example, a user interacts with device 800 by providing audio commands that are received and processed by processor 810.

Display subsystem 830 represents hardware (e.g., display devices) and software components (e.g., drivers) that provide a visual display for presentation to a user. In one example, the display includes tactile components or touchscreen elements for a user to interact with the computing device. Display subsystem 830 includes display interface 832, which includes the particular screen or hardware device used to provide a display to a user. In one example, display interface 832 includes logic separate from processor 810 (such as a graphics processor) to perform at least some processing related to the display. In one example, display subsystem 830 includes a touchscreen device that provides both output and input to a user. In one example, display subsystem 830 includes a high definition (HD) display that provides an output to a user. High definition can refer to a display having a pixel density of approximately 100 PPI (pixels per inch) or greater, and can include formats such as full HD (e.g., 1080p), retina displays, 4K (ultra high definition or UHD), or others. In one example, display subsystem includes a touchscreen display. In one example, display subsystem 830 generates display information based on data stored in memory or based on operations executed by processor 810 or both.

I/O controller 840 represents hardware devices and software components related to interaction with a user. I/O controller 840 can operate to manage hardware that is part of audio subsystem 820, or display subsystem 830, or both. Additionally, I/O controller 840 illustrates a connection point for additional devices that connect to device 800 through which a user might interact with the system. For example, devices that can be attached to device 800 might include microphone devices, speaker or stereo systems, video systems or other display device, keyboard or keypad devices, or other I/O devices for use with specific applications such as card readers or other devices.

As mentioned above, I/O controller 840 can interact with audio subsystem 820 or display subsystem 830 or both. For example, input through a microphone or other audio device can provide input or commands for one or more applications or functions of device 800. Additionally, audio output can be provided instead of or in addition to display output. In another example, if display subsystem includes a touchscreen, the display device also acts as an input device, which can be at least partially managed by I/O controller 840. There can also be additional buttons or switches on device 800 to provide I/O functions managed by I/O controller 840.

In one example, I/O controller 840 manages devices such as accelerometers, cameras, light sensors or other environmental sensors, gyroscopes, global positioning system (GPS), or other hardware that can be included in device 800, or sensors 812. The input can be part of direct user interaction, as well as providing environmental input to the system to influence its operations (such as filtering for noise, adjusting displays for brightness detection, applying a flash for a camera, or other features).

In one example, device 800 includes power management 850 that manages battery power usage, charging of the battery, and features related to power saving operation. Power management 850 manages power from power source 852, which provides power to the components of system 800. In one example, power source 852 includes an AC to DC (alternating current to direct current) adapter to plug into a wall outlet. Such AC power can be renewable energy (e.g., solar power, motion based power). In one example, power source 852 includes only DC power, which can be provided by a DC power source, such as an external AC to DC converter. In one example, power source 852 includes wireless charging hardware to charge via proximity to a charging field. In one example, power source 852 can include an internal battery or fuel cell source.

Memory subsystem 860 includes memory device(s) 862 for storing information in device 800. Memory subsystem 860 can include nonvolatile (state does not change if power to the memory device is interrupted) or volatile (state is indeterminate if power to the memory device is interrupted) memory devices, or a combination. Memory 860 can store application data, user data, music, photos, documents, or other data, as well as system data (whether long-term or temporary) related to the execution of the applications and functions of system 800. In one example, memory subsystem 860 includes memory controller 864 (which could also be considered part of the control of system 800, and could potentially be considered part of processor 810). Memory controller 864 includes a scheduler to generate and issue commands to control access to memory device 862.

Connectivity 870 includes hardware devices (e.g., wireless or wired connectors and communication hardware, or a combination of wired and wireless hardware) and software components (e.g., drivers, protocol stacks) to enable device 800 to communicate with external devices. The external device could be separate devices, such as other computing devices, wireless access points or base stations, as well as peripherals such as headsets, printers, or other devices. In one example, system 800 exchanges data with an external device for storage in memory or for display on a display device. The exchanged data can include data to be stored in memory, or data already stored in memory, to read, write, or edit data.

Connectivity 870 can include multiple different types of connectivity. To generalize, device 800 is illustrated with cellular connectivity 872 and wireless connectivity 874. Cellular connectivity 872 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 874 refers to wireless connectivity that is not cellular, and can include personal area networks (such as Bluetooth), local area networks (such as WiFi), or wide area networks (such as WiMax), or other wireless communication, or a combination. Wireless communication refers to transfer of data through the use of modulated electromagnetic radiation through a non-solid medium. Wired communication occurs through a solid communication medium.

Peripheral connections 880 include hardware interfaces and connectors, as well as software components (e.g., drivers, protocol stacks) to make peripheral connections. It will be understood that device 800 could both be a peripheral device ("to" 882) to other computing devices, as well as have peripheral devices ("from" 884) connected to it. Device 800 commonly has a "docking" connector to connect to other computing devices for purposes such as managing (e.g., downloading, uploading, changing, synchronizing) content on device 800. Additionally, a docking connector can allow device 800 to connect to certain peripherals that allow device 800 to control content output, for example, to audiovisual or other systems.

In addition to a proprietary docking connector or other proprietary connection hardware, device 800 can make peripheral connections 880 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), or other type.

In general with respect to the descriptions herein, in one example, an apparatus for data storage includes: a hardware platform including a drive interconnect, hardware to execute a host operating system, and a solid state drive (SSD) controller; and an SSD coupled to the hardware platform drive interconnect, the SSD including a first segment of nonvolatile (NV) media as a cache for a second segment of NV media, the second segment of NV media having a slower access than the first segment, wherein the SSD is to implement idle eviction from the first segment to the second segment based on an idle condition of the SSD; wherein the SSD is to dynamically change application of the idle eviction based on a power management state indicated for the hardware platform.

In one example, the power management state includes a power saving state or a performance state. In one example, the power management state includes a battery level indication. In one example, dynamically change application of the idle eviction includes a change to a minimum number of pages to evict during idle eviction. In one example, the SSD controller is to send power management state information to the SSD. In one example, the hardware platform is to send the power management state to the SSD in response to a request for state by the SSD. In one example, the first segment comprises a single level cell (SLC) flash memory and the second segment comprises a quad level cell (QLC) flash memory.

In general with respect to the descriptions herein, in one example, a computing device with data storage includes: a drive interconnect to couple to a solid state drive (SSD) having a first segment of nonvolatile (NV) media as a cache for a second segment of NV media, the second segment of NV media having a slower access than the first segment, wherein the SSD is to implement idle eviction from the first segment to the second segment based on an idle condition of the SSD; a host processor device to execute a host operating system; and an SSD controller to send a power management state indication to the SSD to cause the SSD to dynamically change application of the idle eviction based on the power management state indicated for the hardware platform.

In one example, the power management state includes a power saving state or a performance state. In one example, the power management state includes a battery level indication. In one example, the power management state indication is to cause the SSD to dynamically change to a minimum number of pages to evict during idle eviction. In one example, the SSD controller is to receive a request from the SSD for power management state, and send the power management state to the SSD in response to the request. In one example, the first segment comprises a single level cell (SLC) flash memory and the second segment comprises a quad level cell (QLC) flash memory. In one example, the host processor device includes a multi-core processor. In one example, the computing device includes a display communicatively coupled to host processor; or a network interface communicatively coupled to host processor; or a battery to power the computing device, or a combination of these.

In general with respect to the descriptions herein, in one example, a solid state drive (SSD) includes: a first segment of nonvolatile (NV) media; a second segment of NV media having a slower access than the first segment, the first segment of NV media to operate as a cache for the second segment of NV media; and an internal controller internal to the SSD to implement idle eviction from the first segment to the second segment based on an idle condition of the SSD, the internal controller to receive a power management state indication from an SSD controller implemented on an associated host platform, and to dynamically change application of the idle eviction based on the received power management state indication for the host platform.

In one example, the power management state includes a power saving state or a performance state. In one example, the power management state includes a battery level indication. In one example, to dynamically change application of the idle eviction includes a change to a minimum number of pages to evict during idle eviction. In one example, the SSD includes an internal controller to request the power management state indication from the host platform. In one example, the first segment comprises a single level cell (SLC) flash memory and the second segment comprises a quad level cell (QLC) flash memory.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. An apparatus for data storage, comprising:
a hardware platform including a drive interconnect, hardware to execute a host operating system, and a solid state drive (SSD) controller; and
an SSD coupled to the hardware platform drive interconnect, the SSD including a first segment of nonvolatile (NV) media as a cache for a second segment of NV media, the second segment of NV media having a slower access than the first segment, wherein the SSD is to implement idle eviction from the first segment to the second segment based on an idle condition of the SSD, wherein in response to the idle condition, at least a minimum amount of data is to be evicted from the first segment to the second segment prior to the SSD entering a low power state;

wherein the SSD is to dynamically change application of the idle eviction based on a power management state indicated for the hardware platform, including to change the minimum amount of data to be evicted prior to the SSD entering the low power state.

2. The apparatus of claim 1, wherein the power management state includes a power saving state or a performance state.

3. The apparatus of claim 1, wherein the power management state includes a battery level indication.

4. The apparatus of claim 1, wherein to dynamically change the minimum amount of data to be evicted prior to the SSD entering the low power state comprises a change to a minimum number of pages of data to evict during idle eviction.

5. The apparatus of claim 1, wherein the SSD controller is to send power management state information to the SSD, wherein the SSD is to change the minimum amount of data to be evicted in response to the power management state information based on a low power state to be entered after idle eviction.

6. The apparatus of claim 1, wherein the hardware platform is to send the power management state to the SSD in response to a request for state by the SSD, wherein the SSD is to change the minimum amount of data to be evicted in response to the power management state based on a low power state to be entered after idle eviction.

7. The apparatus of claim 1, wherein the first segment comprises a single level cell (SLC) flash memory and the second segment comprises a quad level cell (QLC) flash memory.

8. A computing device with data storage, comprising:
a drive interconnect to couple to a solid state drive (SSD) having a first segment of nonvolatile (NV) media as a cache for a second segment of NV media, the second segment of NV media having a slower access than the first segment, wherein the SSD is to implement idle eviction from the first segment to the second segment to evict data from the first segment of NV media to the second segment of NV media while the SSD is in an idle state, wherein in the idle state, at least a minimum amount of data is to be evicted from the first segment to the second segment prior to the SSD transitioning from the idle state to a low power state;
a host processor device to execute a host operating system; and
an SSD controller to send a power management state indication to indicate a power management state for the host processor device to the SSD to cause the SSD to dynamically change application of the idle eviction between an application of idle eviction based on performance and an application of idle eviction based on power saving, based on the power management state indicated for the host processor device, including to change the minimum amount of data to be evicted prior to transitioning from the idle state to the low power state.

9. The computing device of claim 8, wherein the power management state includes a power saving state or a performance state.

10. The computing device of claim 8, wherein the power management state includes a battery level indication.

11. The computing device of claim 8, wherein the power management state indication is to cause the SSD to dynamically change the minimum amount of data to be evicted prior to the SSD entering the low power state based on power saving, to evict a minimum number of pages of data during idle eviction.

12. The computing device of claim 8, wherein the SSD controller is to receive a request from the SSD for power management state, and send the power management state to the SSD in response to the request, wherein the SSD is to change the minimum amount of data to be evicted in response to the power management state based on a low power state to be entered after idle eviction.

13. The computing device of claim 8, wherein the first segment comprises a single level cell (SLC) flash memory and the second segment comprises a quad level cell (QLC) flash memory.

14. The computing device of claim 8, wherein the host processor device includes a multi-core processor;
further comprising a display communicatively coupled to host processor;
further comprising a network interface communicatively coupled to host processor; or
further comprising a battery to power the computing device.

15. A solid state drive (SSD), comprising:
a first segment of nonvolatile (NV) media;
a second segment of NV media having a slower access than the first segment, the first segment of NV media to operate as a cache for the second segment of NV media; and
an internal controller internal to the SSD to implement idle eviction from the first segment to the second segment based on an idle condition of the SSD, wherein in response to the idle condition, at least a minimum amount of data is to be evicted from the first segment to the second segment prior to the SSD entering a low power state, the internal controller to receive a power management state indication from an SSD controller implemented on an associated host platform, and to dynamically change application of the idle eviction based on the received power management state indication for the associated host platform, including to change the minimum amount of data to be evicted prior to the SSD entering the low power state.

16. The SSD of claim 15, wherein the power management state indication includes a power saving state or a performance state.

17. The SSD of claim 15, wherein the power management state indication includes a battery level indication.

18. The SSD of claim 15, wherein to dynamically change the minimum amount of data to be evicted prior to the SSD entering the low power state comprises changing a minimum number of pages of data to evict during idle eviction.

19. The SSD of claim 15, further comprising the internal controller to request the power management state indication from the associated host platform, wherein the SSD is to change the minimum amount of data to be evicted in response to the power management state indication based on a low power state to be entered after idle eviction.

20. The SSD of claim 15, wherein the first segment comprises a single level cell (SLC) flash memory and the second segment comprises a quad level cell (QLC) flash memory.

* * * * *